United States Patent
Bailey et al.

(10) Patent No.: US 8,055,838 B2
(45) Date of Patent: Nov. 8, 2011

(54) APPARATUS AND METHOD FOR AUTONOMICALLY SUSPENDING AND RESUMING LOGICAL PARTITIONS WHEN I/O RECONFIGURATION IS REQUIRED

(75) Inventors: David Alan Bailey, Kasson, MN (US); William Joseph Armstrong, Rochester, MN (US); Naresh Nayar, Rochester, MN (US); Gregory Michael Nordstrom, Pine Island, MN (US)

(73) Assignee: International Business Machines Corporation, Armonk, NY (US)

( * ) Notice: Subject to any disclaimer, the term of this patent is extended or adjusted under 35 U.S.C. 154(b) by 1436 days.

(21) Appl. No.: 10/624,808

(22) Filed: Jul. 22, 2003

(65) Prior Publication Data

US 2005/0021936 A1 Jan. 27, 2005

(51) Int. Cl.
*G06F 13/10* (2006.01)

(52) U.S. Cl. ........................................ 711/108

(58) Field of Classification Search ................ None
See application file for complete search history.

(56) References Cited

U.S. PATENT DOCUMENTS

| | | | |
|---|---|---|---|
| 6,330,656 B1 * | 12/2001 | Bealkowski et al. | 712/13 |
| 2002/0112102 A1 * | 8/2002 | Tarui et al. | 710/60 |
| 2003/0084030 A1 * | 5/2003 | Day et al. | 707/3 |
| 2003/0163641 A1 * | 8/2003 | Kaneko | 711/114 |

* cited by examiner

*Primary Examiner* — Duc Doan
(74) *Attorney, Agent, or Firm* — Martin & Associates, LLC; Derek P. Martin

(57) ABSTRACT

A partition manager includes an I/O reconfiguration mechanism and a logical partition suspend/resume mechanism that work together to perform autonomic I/O reconfiguration in a logically partitioned computer system. When I/O reconfiguration is required, the affected logical partitions are suspended, the I/O is reconfigured, and the affected logical partitions are resumed. Because the logical partitions are suspended during I/O reconfiguration, any ghost packet that may occur when the I/O is reconfigured is ignored.

2 Claims, 7 Drawing Sheets

APPARATUS AND METHOD FOR AUTONOMICALLY SUSPENDING AND RESUMING LOGICAL PARTITIONS WHEN I/O RECONFIGURATION IS REQUIRED

BACKGROUND OF THE INVENTION

1. Technical Field

This invention generally relates to data processing, and more specifically relates to detection of resources in a logically partitioned computer system.

2. Background Art

Since the dawn of the computer age, computer systems have evolved into extremely sophisticated devices that may be found in many different settings. Computer systems typically include a combination of hardware (e.g., semiconductors, circuit boards, etc.) and software (e.g., computer programs). As advances in semiconductor processing and computer architecture push the performance of the computer hardware higher, more sophisticated computer software has evolved to take advantage of the higher performance of the hardware, resulting in computer systems today that are much more powerful than just a few years ago.

The combination of hardware and software on a particular computer system defines a computing environment. Different hardware platforms and different operating systems thus provide different computing environments. In recent years, engineers have recognized that it is possible to provide different computing environments on the same physical computer system by logically partitioning the computer system resources to different computing environments. The iSeries computer system developed by IBM is an example of a computer system that supports logical partitioning. If logical partitioning on an iSeries computer system is desired, partition manager code (referred to as a "hypervisor" in iSeries terminology) is installed that allows defining different computing environments on the same platform. Once the partition manager is installed, logical partitions may be created that define different computing environments. The partition manager manages the logical partitions to assure that they can share needed resources in the computer system while maintaining the separate computing environments defined by the logical partitions.

A computer system that includes multiple logical partitions typically shares resources between the logical partitions. For example, a computer system with a single CPU could have two logical partitions defined, with 50% of the CPU allocated to each logical partition, with 33% of the memory allocated to the first logical partition and 67% of the memory allocated to the second logical partition, and with two different I/O slots allocated to the two logical partitions, one per partition. Once logical partitions are defined and shared resources are allocated to the logical partitions, each logical partition acts as a separate computer system. Thus, in the example above that has a single computer system with two logical partitions, the two logical partitions will appear for all practical purposes to be two separate and distinct computer systems.

A problem with known logically partitioned computer systems occurs when certain conditions occur in I/O hardware that require the I/O to be reconfigured. For example, when I/O towers are added to an existing loop of towers, the loop may need to be rebalanced to optimize performance. A prior art method 200 is shown in FIG. 2. A hardware state is detected that requires I/O reconfiguration (step 210). The I/O is then reconfigured without suspending the affected logical partitions (i.e., the logical partitions that own the I/O that is reconfigured) (step 220). One known implementation of step 220 in FIG. 2 is shown in FIG. 3. The I/O to be reconfigured is first quiesced (step 320). Quiescing the I/O includes the steps of masking interrupt sources, disabling arbitration in affected I/O bridges, and waiting sufficient time that all DMA transfers in progress may complete. Once quiesced, the I/O is reconfigured (step 330). The I/O is then enabled for use (step 340).

Prior art method 200 does not stop logical partitions from executing. As a result, a phenomenon known as "ghost packets" can occur which may cause one or more invalid network packets as a result of the reconfiguration. Because the logical partitions are still running, one of the logical partitions may interpret a ghost packet as valid data, causing potential problems with data integrity. Without a way to reconfigure I/O in a logically partitioned computer system without interpreting ghost packets as valid data, the computer industry will continue to suffer from potential data integrity problems when I/O is reconfigured in a logically partitioned computer system.

DISCLOSURE OF INVENTION

A partition manager includes an I/O reconfiguration mechanism and a logical partition suspend/resume mechanism that work together to perform autonomic I/O reconfiguration in a logically partitioned computer system. When I/O reconfiguration is required, the affected logical partitions are suspended, the I/O is reconfigured, and the affected logical partitions are resumed. Because the logical partitions are suspended during I/O reconfiguration, any ghost packet that may occur when the I/O is reconfigured is ignored.

The foregoing and other features and advantages of the invention will be apparent from the following more particular description of preferred embodiments of the invention, as illustrated in the accompanying drawings.

BRIEF DESCRIPTION OF DRAWINGS

The preferred embodiments of the present invention will hereinafter be described in conjunction with the appended drawings, where like designations denote like elements, and.

BEST MODE FOR CARRYING OUT THE INVENTION

According to preferred embodiments of the present invention, a partition manager includes an I/O reconfiguration mechanism and a logical partition suspend/resume mechanism that are used when I/O reconfiguration is required. To reconfigure the I/O, the I/O is first quiesced. The affected logical partitions are then suspended. The I/O is then reconfigured while the logical partitions are suspended. Once reconfiguration of the I/O is complete, the logical partitions are resumed. Because the logical partitions are not running when I/O reconfiguration is performed, there is no risk of any ghost packets being interpreted by a logical partition as valid data.

Figure 1:
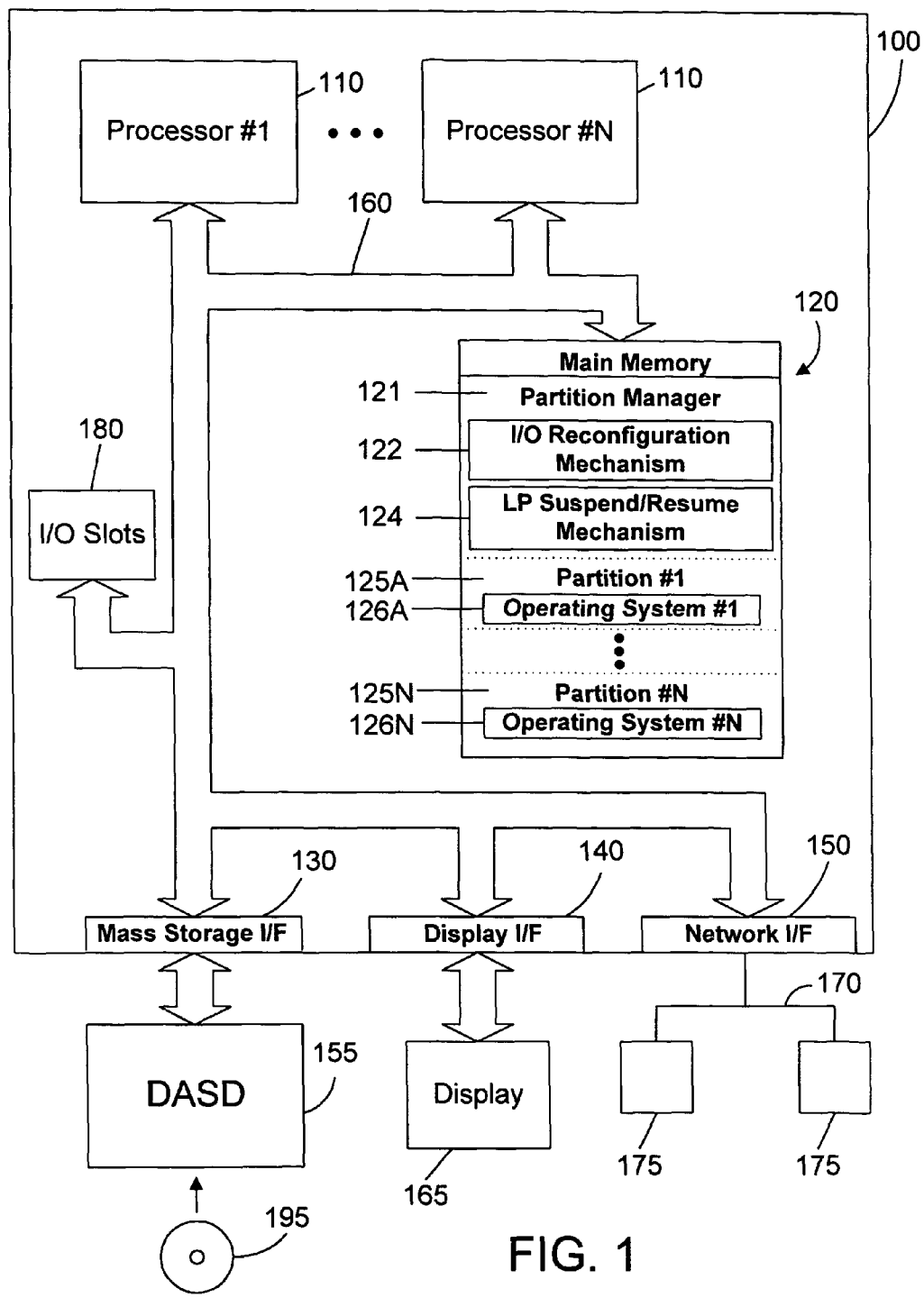
FIG. 1 is a block diagram of a computer apparatus that supports logical partitioning and I/O reconfiguration in accordance with the preferred embodiments.
Figure 2:
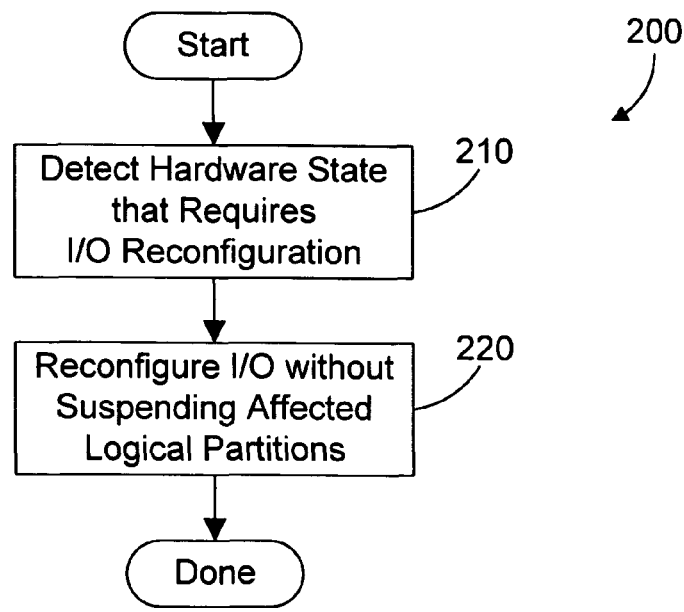
FIG. 2 is a flow diagram of a prior art method performed during initial system power on of a logically partitioned computer system.
Figure 3:
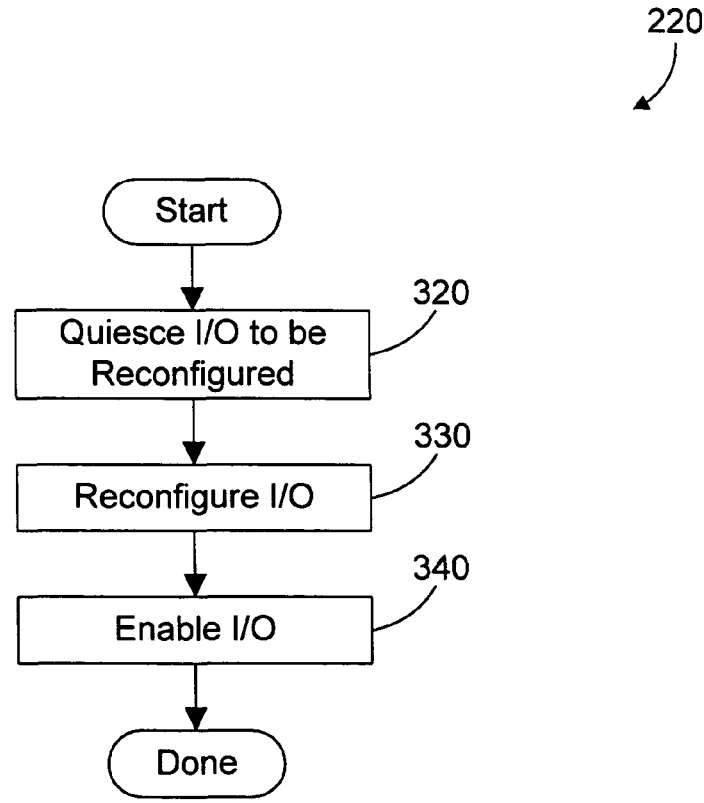
FIG. 3 is a flow diagram showing one known implementation of step 220 in FIG. 2.

Referring to FIG. 1, a computer system 100 is an enhanced IBM eServer iSeries computer system, and represents one suitable type of computer system that supports logical partitioning and I/O reconfiguration in accordance with the preferred embodiments. Those skilled in the art will appreciate that the mechanisms and apparatus of the present invention apply equally to any computer system that supports logical partitions. As shown in FIG. 1, computer system 100 comprises one or more processors 110 connected to a main memory 120, a mass storage interface 130, a display interface 140, a network interface 150, and a plurality of I/O slots 180. These system components are interconnected through the use of a system bus 160. Mass storage interface 130 is used to connect mass storage devices (such as a direct access storage device 155) to computer system 100. One specific type of direct access storage device is a CD RW drive, which may read data from a CD RW 195. Note that mass storage interface 130, display interface 140, and network interface 150 may actually be implemented in adapters coupled to I/O slots 180.

Main memory 120 contains a partition manager 121, an I/O reconfiguration mechanism 122, a logical partition suspend/resume mechanism 124, and N logical partitions 125, shown in FIG. 1 as logical partitions 125A through 125N. Partition manager 121 preferably creates these N logical partitions 125. Each logical partition 125 preferably includes a corresponding operating system 126, shown in FIG. 1 as operating systems 126A through 126N.

I/O reconfiguration mechanism 122 is used to reconfigure I/O as required. Logical partition suspend/resume mechanism 124 is used to suspend affected logical partitions before I/O is reconfigured by I/O reconfiguration mechanism 122, and is used to resume affected logical partitions after I/O is reconfigured by I/O reconfiguration mechanism 122. By assuring that affected logical partitions are suspended during I/O reconfiguration, the potential problems caused by ghost packets are eliminated. The partition manager 121 uses the I/O reconfiguration mechanism 122 and logical partition suspend/resume mechanism 124 to autonomically detect when reconfiguration of I/O is required, and to autonomically perform the reconfiguration of the I/O only after affected logical partitions have been suspended.

Operating system 126 is a multitasking operating system, such as OS/400, AIX, or Linux; however, those skilled in the art will appreciate that the spirit and scope of the present invention is not limited to any one operating system. Any suitable operating system can be used. Operating system 126 is a sophisticated program that contains low-level code to manage the resources of computer system 100. Some of these resources are processor 110, main memory 120, mass storage interface 130, display interface 140, network interface 150, system bus 160, and I/O slots 180. The operating system 126 in each partition may be the same as the operating system in other partitions, or may be a completely different operating system. Thus, one partition can run the OS/400 operating system, while a different partition can run another instance of OS/400, possibly a different release, or with different environment settings (e.g., time zone). The operating systems in the logical partitions could even be different than OS/400, provided it is compatible with the hardware (such as AIX or Linux). In this manner the logical partitions can provide completely different computing environments on the same physical computer system.

The partitions 125A-125N are shown in FIG. 1 to reside within the main memory 120. However, one skilled in the art will recognize that a partition is a logical construct that includes resources other than memory. A logical partition typically specifies a portion of memory, along with an assignment of processor capacity and other system resources, such as I/O slots 180. Thus, one partition could be defined to include two processors and a portion of memory 120, along with one or more I/O processors that can provide the functions of mass storage interface 130, display interface 140, network interface 150, or interfaces to I/O devices plugged into I/O slots 180. Another partition could then be defined to include three other processors, a different portion of memory 120, and one or more I/O processors. The partitions are shown in FIG. 1 to symbolically represent logical partitions, which would include system resources outside of memory 120 within computer system 100. Note also that the partition manager 121, the I/O reconfiguration mechanism 122, and the logical partition suspend/resume mechanism 124 preferably reside in memory and hardware separate from the logical partitions and are facilities and mechanisms that are not directly available to the logical partitions.

Computer system 100 utilizes well known virtual addressing mechanisms that allow the programs of computer system 100 to behave as if they only have access to a large, single storage entity instead of access to multiple, smaller storage entities such as main memory 120 and DASD device 155. Therefore, while partition manager 121 and the partitions 125A-125N are shown to reside in main memory 120, those skilled in the art will recognize that these items are not necessarily all completely contained in main memory 120 at the same time. It should also be noted that the term "memory" is used herein to generically refer to the entire virtual memory of computer system 100.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions that make up the partition manager 121, which initializes the operating systems in the logical partitions.

Although computer system 100 is shown to contain only a single system bus, those skilled in the art will appreciate that the present invention may be practiced using a computer system that has multiple buses. In addition, the I/O interfaces that are used in the preferred embodiment each may include separate, fully programmed microprocessors that are used to off-load compute-intensive processing from processor 110, as in iSeries input/output processors, or may be simple industry standard I/O adapters (IOAs).

Display interface 140 is used to directly connect one or more displays 165 to computer system 100. These displays 165, which may be non-intelligent (i.e., dumb) terminals or fully programmable workstations, are used to allow system administrators and users to communicate with computer system 100. Note, however, that while display interface 140 is provided to support communication with one or more displays 165, computer system 100 does not necessarily require a display 165, because all needed interaction with users and other processes may occur via network interface 150.

Network interface 150 is used to connect other computer systems and/or workstations (e.g., 175 in FIG. 1) to computer system 100 across a network 170. The present invention applies equally no matter how computer system 100 may be connected to other computer systems and/or workstations, regardless of whether the network connection 170 is made using present-day analog and/or digital techniques or via some networking mechanism of the future. In addition, many different network protocols can be used to implement a network. These protocols are specialized computer programs that allow computers to communicate across network 170. TCP/IP (Transmission Control Protocol/Internet Protocol) is an example of a suitable network protocol.

At this point, it is important to note that while the present invention has been and will continue to be described in the context of a fully functional computer system, those skilled in the art will appreciate that the present invention is capable of being distributed as a program product in a variety of forms, and that the present invention applies equally regardless of the particular type of computer readable signal bearing media used to actually carry out the distribution. Examples of suitable signal bearing media include: recordable type media such as floppy disks and CD RW (e.g., 195 of FIG. 1), and transmission type media such as digital and analog communications links.

Figure 4:
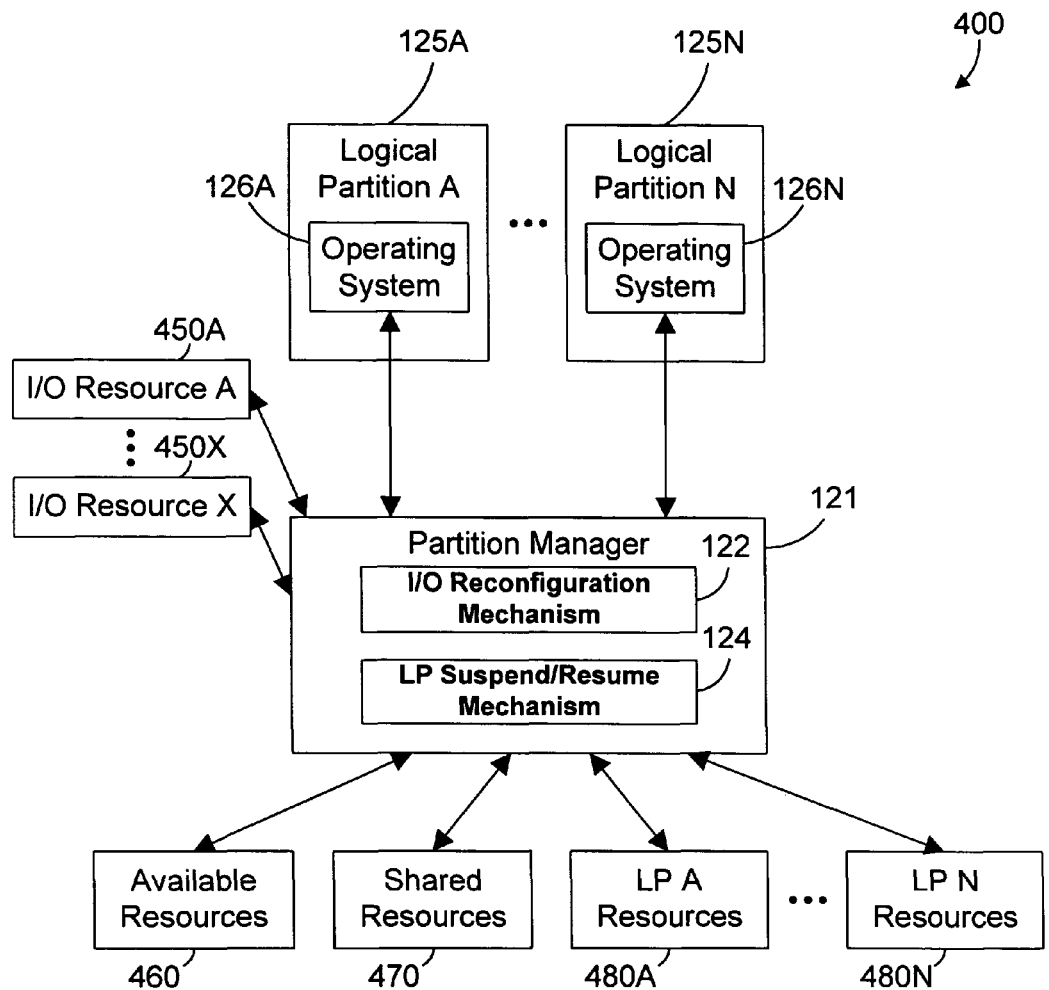
FIG. 4 is a block diagram showing a logical view of the computer system 100 of FIG. 1.

While FIG. 1 shows a sample computer system that includes some of the salient features of both hardware and software in accordance with the preferred embodiments, a more detailed logical view of some of the components in FIG. 1 is shown as system 400 in FIG. 4. In system 400, N logical partitions 125A-125N are shown executing their respective operating systems 126A-126N. The logical partitions are managed by a partition manager 121. Partition manager 121 manages I/O resources 450, shown in FIG. 4 as I/O resource 450A through I/O resource 450X. An "I/O resource" in this context may be any hardware or software that may be independently allocated by partition manager 121 to one or more of the logical partitions. Examples of hardware I/O resources include processors, memory, hard disk drives, and I/O slots. Examples of software I/O resources include a database, internal communications (such as a logical LAN), or applications (such as word processors, e-mail, etc.).

An I/O resource, once made available to the partition manager 121, is categorized as an available resource 460 if it has not yet been assigned to a logical partition, is categorized as a shared resource 470 if multiple logical partitions may access the resource, and is categorized as a dedicated resource 480 if it has been exclusively assigned to a logical partition. FIG. 4 shows dedicated resources 480A . . . 480N that correspond to each logical partition 125A . . . 125N. Dedicated resources 480 are said to be "owned" by the logical partition to which they are assigned. The partition manager 121 includes an I/O reconfiguration mechanism 122 that acts in concert with a logical partition suspend/resume mechanism 124 to perform autonomic detection when I/O reconfiguration is required and to perform autonomic reconfiguration of the I/O in a way that eliminates problems caused by ghost packets by assuring affected logical partitions are suspended when I/O reconfiguration occurs.

Figure 5:
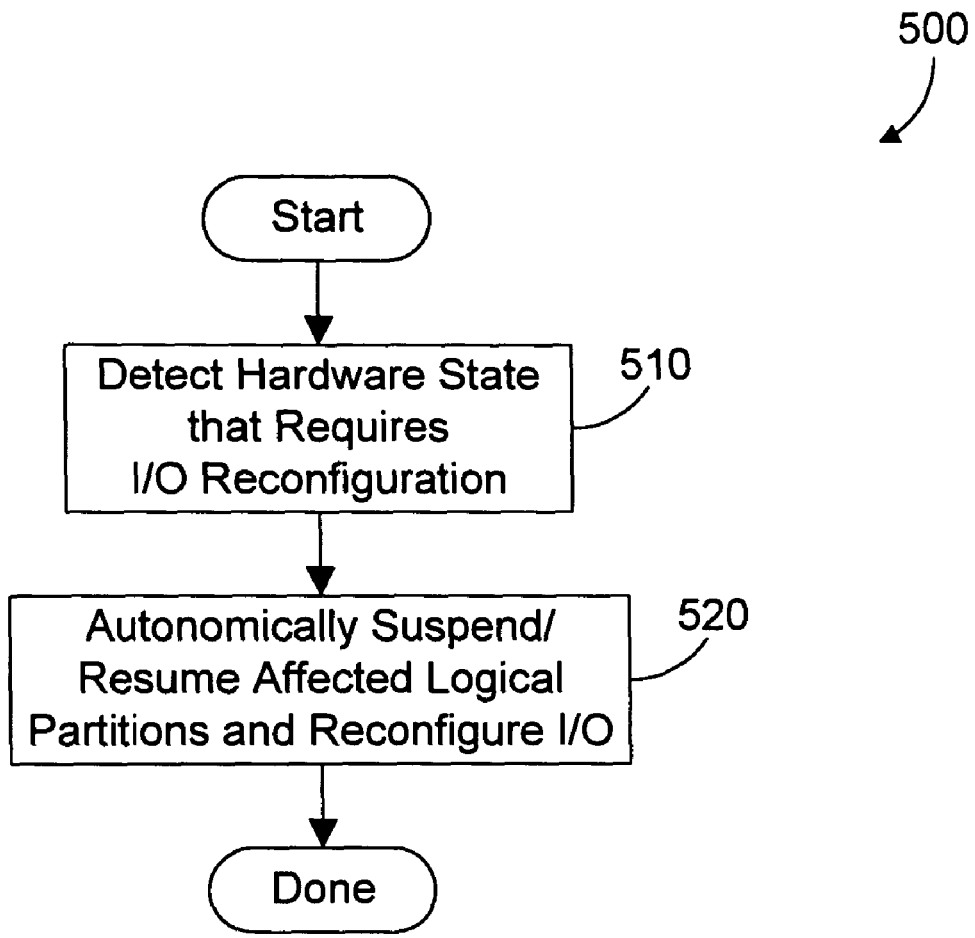
FIG. 5 is a flow diagram of a method for reconfiguring I/O in a logically partitioned computer system in accordance with the preferred embodiments.

Referring now to FIG. 5, a method 500 in accordance with the preferred embodiments begins by detecting a hardware state that requires I/O reconfiguration (step 510). Affected logical partitions are then suspended, the I/O is reconfigured, and the logical partitions are resumed, all autonomically (step 520).

Figure 6:
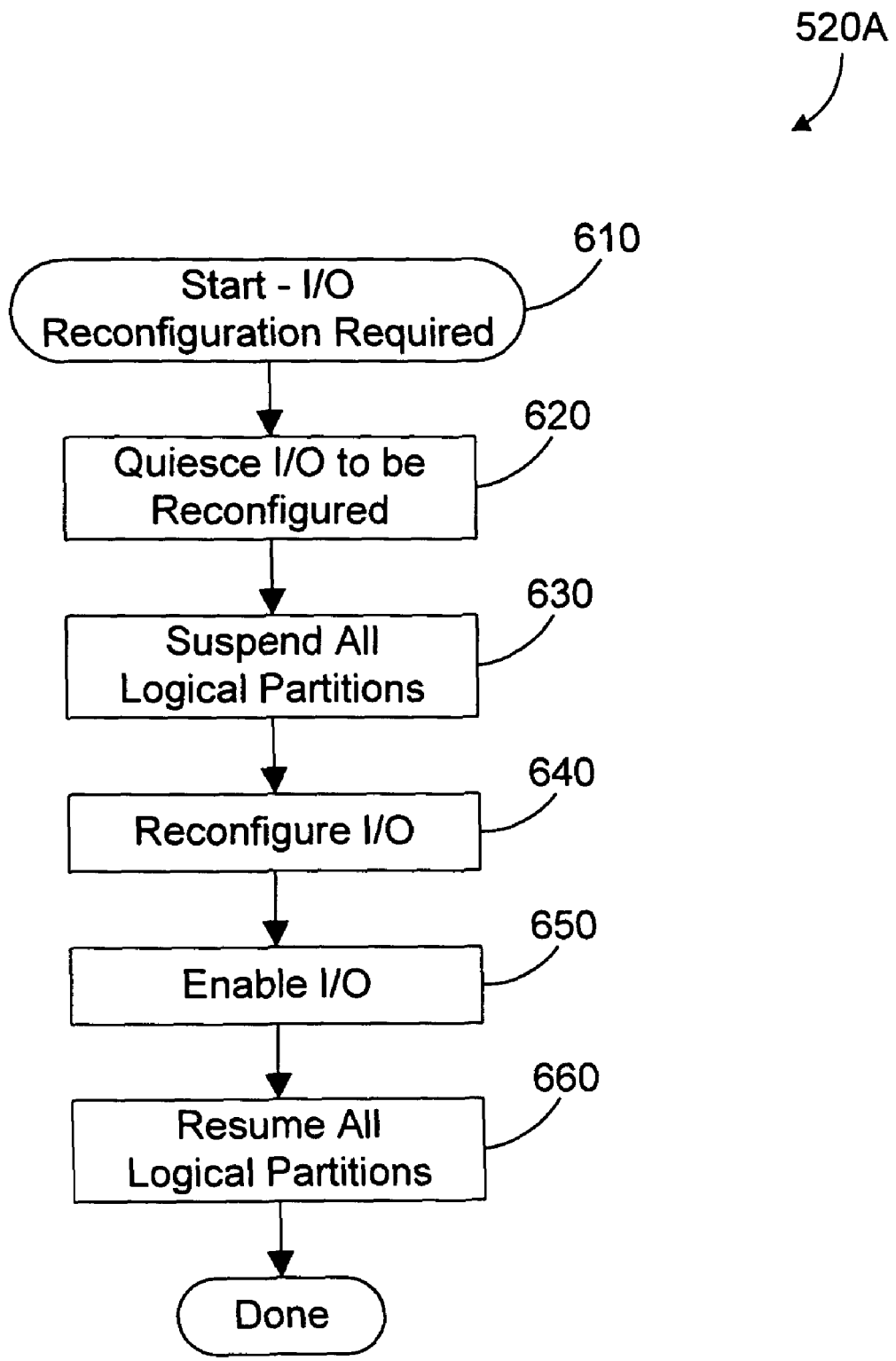
FIG. 6 is a flow diagram of a first specific implementation of step 520 in FIG. 5 in accordance with the preferred embodiments.

One specific implementation of step 520 in accordance with the preferred embodiments is shown as method 520A in FIG. 6. Step 520A begins when I/O reconfiguration is required (step 610). The I/O to be reconfigured is quiesced (step 620). Quiescing I/O consists of putting the I/O in a quiescent state by allowing the I/O to complete any pending operations and by inhibiting future operations. All the logical partitions are then suspended (step 630). Suspending the logical partitions in step 630 is preferably performed by inhibiting the dispatching of tasks to the logical partitions, and waiting until all pending tasks are complete. The I/O is then reconfigured (step 640). The I/O is enabled once reconfiguration is complete (step 650). All logical partitions are then resumed (step 660), preferably by dispatching tasks again to the logical partitions.

Figure 7:
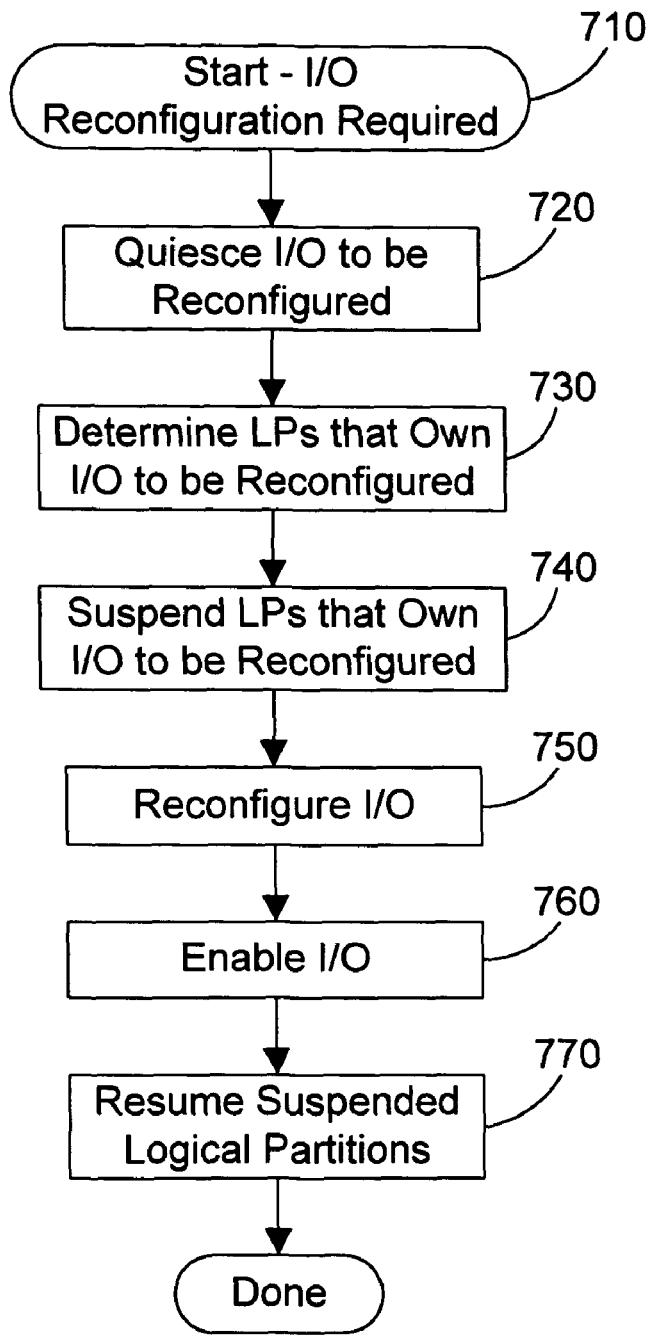
FIG. 7 is a flow diagram of a second specific implementation of step 520 in FIG. 5 in accordance with the preferred embodiments.

Method 520A in FIG. 6 uses a non-intelligent approach by suspending all logical partitions in step 630 then resuming all logical partitions in step 660. Note, however, that suspending all logical partitions may not be required. Method 520B in FIG. 7 is another possible implementation of step 520 in FIG. 5 that shows a more intelligent method in accordance with the preferred embodiments that starts when I/O reconfiguration is required (step 710). The I/O to be reconfigured is quiesced (step 720). The logical partitions that own the I/O to be reconfigured are then determined (step 730). Those logical partitions that own the I/O to be reconfigured are then suspended (step 740). The I/O is reconfigured (step 750), then enabled (step 760). The suspended logical partitions are then resumed (step 770). By determining which logical partitions own the I/O to be reconfigured in step 730, then suspending (step 740) and resuming (step 770) only those affected logical partitions, method 520B allows non-affected logical partitions to continue running, because these non-affected logical partitions do not own the I/O that is being reconfigured and thus the threat of ghost packets from that I/O to non-affected logical partitions is non-existent.

Figure 8:
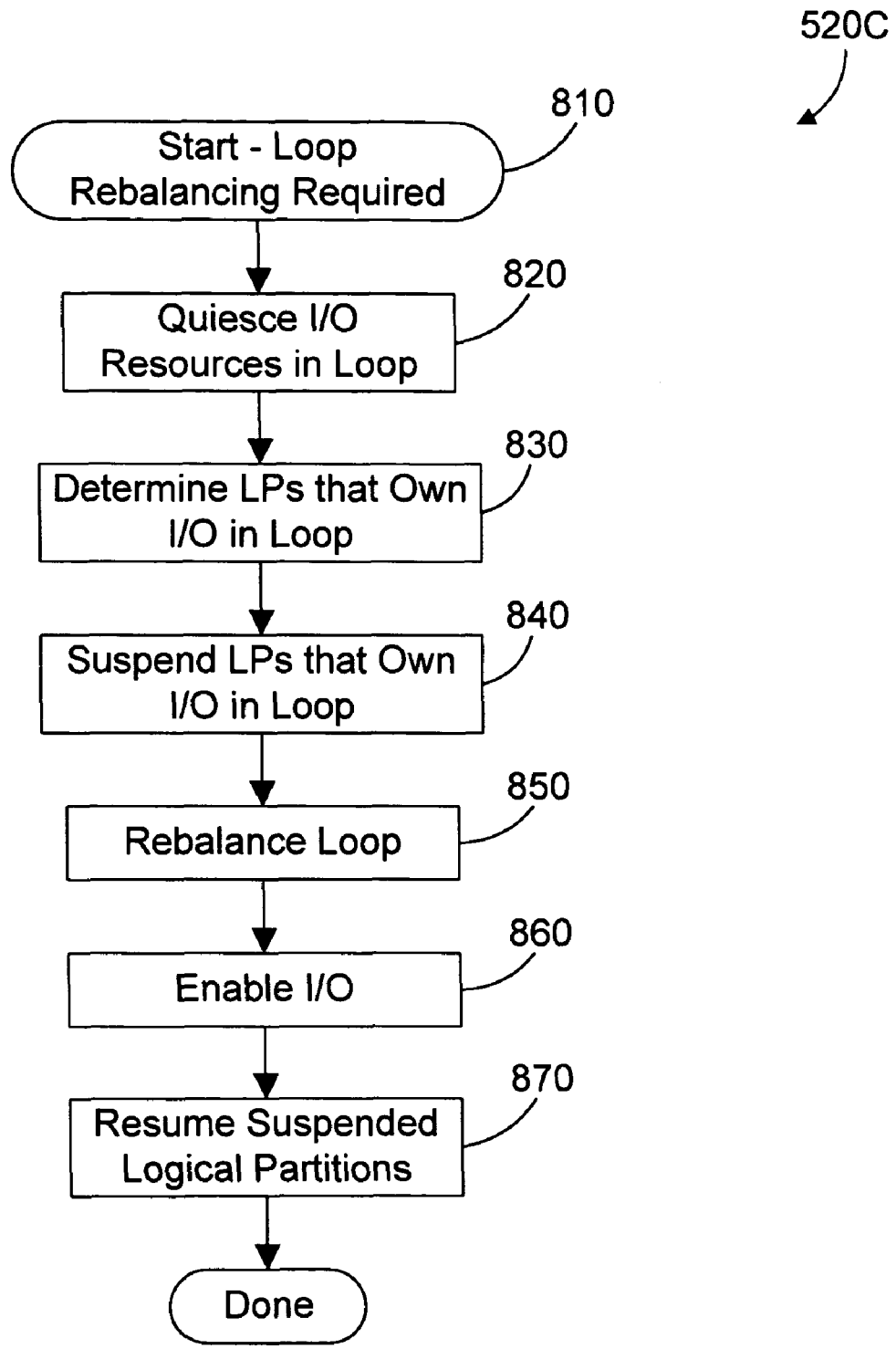
FIG. 8 is a flow diagram of a third specific implementation of step 520 in FIG. 5 for the specific case of loop rebalancing in accordance with the preferred embodiments.

Referring to FIG. 8, method 520C is another possible implementation of step 520 in FIG. 5 that shows a method in accordance with the preferred embodiments for rebalancing an I/O loop. Method 520C begins when loop rebalancing is required (step 810). In many logically partitioned computer systems, a central electronics complex (CEC) that includes processors and memory is coupled to I/O towers via one or more loops. The CEC typically includes two ports for communicating with the I/O towers, and each I/O tower typically includes two ports, which allows the CEC to be coupled to the I/O towers in a loop configuration. Let's assume that the computer system initially includes four I/O towers. Let's further assume that the first two I/O towers in the loop are configured to communicate with the first port on the CEC, and the second two I/O towers in the loop are configured to communicate with the second port on the CEC. Now let's assume that two more towers are added at the beginning of the loop, and are configured to communicate with the first port on the CEC. Now we have four towers that communicate with the first port on the CEC, and two towers that communicate with the second port of the CEC. Note also that the loop configuration would make it preferable to reconfigure the I/O to rebalance the loop by changing the fourth tower to communicate with the second port of the CEC instead of the first port. Method 520C thus begins when a loop needs to be rebalanced.

The I/O resources in the loop are quiesced (step 820). The logical partitions that own the I/O in the loop are then determined (step 830). The logical partitions that own I/O in the loop are then suspended (step 840). The loop is then rebalanced (step 850). For the simple example given above, the loop is rebalanced by changing the fourth tower to communicate with the second port of the CEC instead of the first port.

The I/O is then enabled (step 860), and the suspended logical partitions are resumed (step 870).

The preferred embodiments provide a significant advance over the prior art by assuring that all affected logical partitions are suspended before reconfiguration of I/O occurs, and by resuming the suspended logical partitions after I/O reconfiguration is complete. In this manner, any ghost packet that may be generated during the process of reconfiguring the I/O is not interpreted by any logical partition as valid data.

One skilled in the art will appreciate that many variations are possible within the scope of the present invention. Thus, while the invention has been particularly shown and described with reference to preferred embodiments thereof, it will be understood by those skilled in the art that these and other changes in form and details may be made therein without departing from the spirit and scope of the invention.

What is claimed is:

1. A computer-implemented method for reconfiguring an identified Input/Output (I/O) resource in a computer system that includes a plurality of logical partitions managed by a partition manager executing separately from the plurality of logical partitions, the plurality of logical partitions comprising at least one logical partition that owns the identified I/O resource and at least one logical partition that does not own the identified I/O resource, the method comprising the steps of:

(1) the partition manager detecting a hardware state in the computer system that requires reconfiguration of the identified I/O resource;

(2) the partition manager suspending all of the plurality of logical partitions by inhibiting dispatch of tasks to all of the plurality of logical partitions and waiting until all pending tasks in all of the plurality of logical partitions are complete;

(3) the partition manager reconfiguring the identified I/O resource; and (4) the partition manager resuming all of the plurality of logical partitions by enabling dispatch of tasks to all of the plurality of logical partitions.

2. A computer-implemented method for rebalancing an Input/Output (I/O) loop in a computer system that includes a plurality of logical partitions managed by a partition manager executing separately from the plurality of logical partitions, the method comprising the steps of:

(1) detecting when the I/O loop is unbalanced;

(2) quiescing I/O resources in the I/O loop;

(3) determining which of the plurality of logical partitions own the I/O resources in the I/O loop;

(4) suspending the logical partitions determined in step (3);

(5) rebalancing the I/O loop by allocating at least one I/O resource in the I/O loop from a first logical partition to a second logical partition;

(6) enabling the I/O resources in the I/O loop after rebalancing in step (5); and (7) resuming the logical partitions suspended in step (4).

* * * * *